United States Patent [19]
Toya

[11] Patent Number: 5,376,873
[45] Date of Patent: Dec. 27, 1994

[54] SEQUENTIAL BATTERY CHARGING METHOD FOR PREVENTING UNDER-CHARGING AND OVER-CHARGING OF BATTERY

[75] Inventor: Shoichi Toya, Mihara, Japan

[73] Assignee: Sanyo Electric Co., Ltd., Osaka, Japan

[21] Appl. No.: 59,978

[22] Filed: May 13, 1993

[30] Foreign Application Priority Data

May 15, 1992 [JP] Japan ................. 4-123822

[51] Int. Cl.⁵ .................................. H02J 7/00
[52] U.S. Cl. .............................. 320/20; 320/23
[58] Field of Search ............. 320/20, , 21, 22, 23, 320/24, 31, 32, 37, 38, 39, 40

[56] References Cited

U.S. PATENT DOCUMENTS

| | | | |
|---|---|---|---|
| 4,609,861 | 9/1986 | Inaniwa et al. | 320/23 A |
| 4,670,703 | 6/1987 | Williams | 320/22 |
| 4,767,977 | 8/1988 | Fasen et al. | 320/20 |
| 4,806,840 | 2/1989 | Alexander et al. | 320/20 |
| 5,206,579 | 4/1993 | Kawate et al. | 320/20 |
| 5,229,705 | 7/1993 | Kato | 320/20 |
| 5,237,259 | 8/1993 | Sanpei | 320/23 |

*Primary Examiner*—Kristine L. Peckman
*Attorney, Agent, or Firm*—Wenderoth, Lind & Ponack

[57] ABSTRACT

A battery is charged in three successive charging intervals. In the first charging interval, charging is continued for a fixed time regardless of battery voltage change. In the second charging interval, charging is ceased by detecting a voltage drop from a peak battery voltage. In the third charging interval, charging is ceased by detecting the peak battery voltage. Early disconnect as well as over-charging are prevented.

5 Claims, 5 Drawing Sheets

SEQUENTIAL BATTERY CHARGING METHOD FOR PREVENTING UNDER-CHARGING AND OVER-CHARGING OF BATTERY

BACKGROUND OF THE INVENTION

This invention relates principally to a method of charging nickel-hydrogen and nickel-cadmium batteries, arid in particular to a method which prevents over-charging.

It is important to charge rechargeable batteries to their full charge conditions, and then to cease charging without over-charging. Over-charging has the detrimental effect of significantly reducing battery lifetime. In particular, nickel-hydrogen batteries are characteristically wear with respect to over-charging. It is also important to reliably charge batteries used under various conditions to full charge.

It should be noted that in this application, "cease charging" is not limited to the condition of zero charging current, but rather is taken in broader context to include conditions where full charge is detected and the charging current is reduced to a trickle current.

Two methods, (1) and (2), have been developed to detect a fully charged battery.

(1) ΔV Method

This is a mettled of detecting full charge conditions by detecting a ΔV drop in voltage from the peak voltage value. This method is described, for example, in Japanese Patent Disclosure 288740, 1986. This method utilizes the characteristic of fully charged rechargeable battery voltage to drop from a peak value. FIG. 1 shows voltage change over time during recharging of a rechargeable battery. Rechargeable battery voltage increases rapidly at first, voltage change subsequently decreases, voltage rises steeply near full charge voltage peaks at full charge, and voltage decreases from the peak value with further charging. Consequently, by detecting a ΔV drop in voltage from the peak value, full charge can be detected.

On the other hand, the ΔV method has the drawback that charging of over-discharged non-activated batteries is prematurely ceased by this method. This because, as shown in FIG. 2, nonactivated batteries have voltage characteristics with a voltage drop during the early period of charging. To avoid sensing a ΔV drop at this early point, a method has been developed wherein charging is continued for a fixed time interval after beginning charging regardless of voltage change, then after the fixed time interval has elapsed, voltage drop from its peak value is sensed to cease charging. However, the method of detecting a ΔV drop from the peak voltage to cease charging can significantly reduce battery lifetime for batteries, such as nickel-hydrogen batteries, that are weak with respect to over-charging. When these batteries are charged, the ΔV method results in overcharging as shown by the hatched area of FIG. 1. For this reason, the ΔV method has the drawback that batteries that are weak with respect to over-charging cannot be charged to an optimal condition.

(2) Peak Method

This method detects peak battery voltage to cease charging, and it is described, for example, in Japanese Utility-Model Publication No. 13253, 1985. This method has the feature that over-charging rechargeable batteries is reduced compared to the ΔV method, (1). However, as shown in FIG. 3, when charging normally discharged batteries, charging can be completely stopped prior to reaching full charge. The reason for this, as shown by the broken line segments of FIG. 4, is that the curve representing battery voltage change at the early stages of charging approximates that near full charge. To prevent prematurely breaking off of the charge of normally discharged rechargeable batteries, this method also adopts the technique of charging continuously for a fixed time interval at the beginning of charge. For this reason, this method as well as method (1) have the drawback that fully charged batteries are over-charged.

A further problem with this method is that the length of time for continuous charging without sensing voltage at the beginning of charge must be longer than that for the ΔV method. The reason for this, as shown In FIG. 3, is that the rising voltage curve for a normally discharged battery takes a particularly long time to level off. In method (1), the initial continuous charging time is set to prevent premature break off of charge for nonactivated batteries. On the other hand, in method (2), It is necessary to continuously charge without sensing voltage until the voltage increase for normally discharged batteries levels off. Since the time for the voltage of normally discharged batteries to off is substantially long, it is necessary for the peak method to lengthen the initial continuous charge without sensing voltage. Consequently, this method can charge a normally discharged battery without over-charging, however, as shown in FIG. 5, this method has the drawback that a fully charged battery gets completely over-charged.

As described above, the ΔV method (1) has the drawback that normally discharged rechargeable batteries are over-charged. Method (2) does not over-charge normally discharged rechargeable batteries but has the drawback that fully charged rechargeable batteries are substantially over-charged. Therefore, both methods (1) and (2) have the drawback that over-charging cannot be avoided for normally discharged rechargeable batteries and for fully charged rechargeable batteries.

The present invention was developed to solve the above mentioned problems. It is thus a primary object of the present invention to provide a battery charging method to optimally charge rechargeable batteries and to prevent over-charging and premature disconnection of rechargeable batteries used in various conditions.

SUMMARY OF THE INVENTION

The battery charging method of this invention charges a battery sequentially in a first charging interval, a second charging interval, and a third charging interval. In the first charging interval, charging takes place irrespective of voltage change. In the second charging interval, charging is ceased by detection of a voltage drop from the peak battery voltage. In the third charging Interval, charging is ceased by detection of the peak battery voltage. It is also possible to cease charging in the third charging interval by detecting both peak battery voltage and ΔV.

DETAILED DESCRIPTION OF THE INVENTION

In the battery charging method of the present invention, the time interval for continuous charging irrespective of voltage change is shortened by breaking the entire process of detecting a $\Delta V$ drop from the peak voltage and ceasing charging into a first charging interval and a second charging interval. The former charging method of detecting peak battery voltage can prevent over-charging of normally discharged batteries. However, to prevent premature disconnect, this method requires an initial charging period, where the voltage change resembles that near full charge, in which voltage change is disregarded for a fixed time interval. However, since the charging method of the present invention senses a $\Delta V$ voltage drop from the peak voltage to cease charging in the second charging interval, the first charging interval of continuous charging without sensing battery voltage can be shortened while preventing early disconnect. This is because, although initial charging voltage behavior resembles that near full charge, with the exception of an already fully charged battery, the voltage during initial charging never drops from a peak voltage. A drop from a peak voltage during the second charging interval indicates an already fully charged battery, and consequently it is necessary to cease charging in that charging interval. For normally discharged batteries, the rising voltage curve becomes more gradual, but a $\Delta V$ voltage drop from a peak does not occur and early disconnect does not take place.

Figure 1:
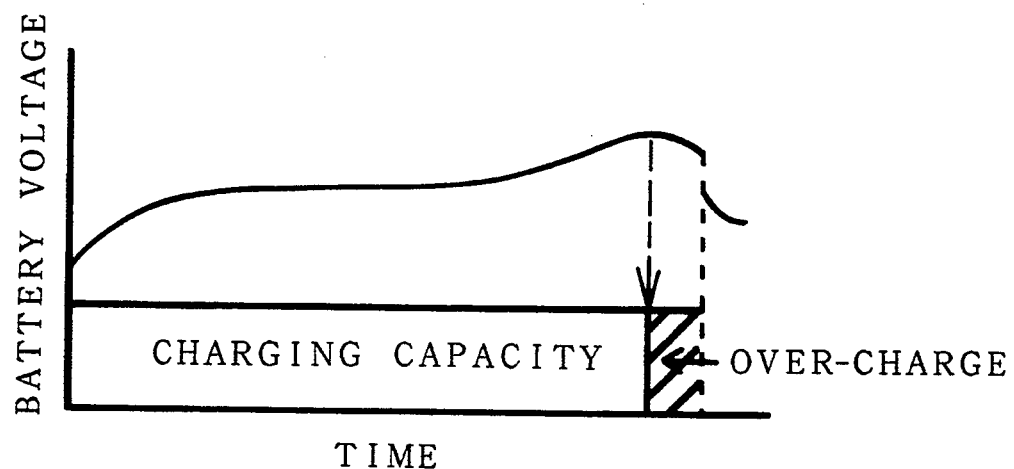
FIG. 1 is a graph showing the voltage curve during charging of a normally discharged battery.
Figure 2:
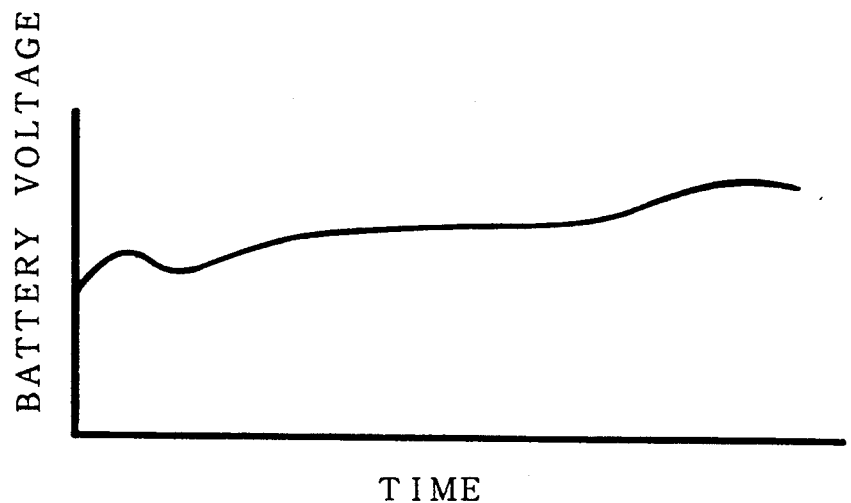
FIG. 2 is a graph showing the voltage curve during charging of an non-activated battery.
Figure 3:
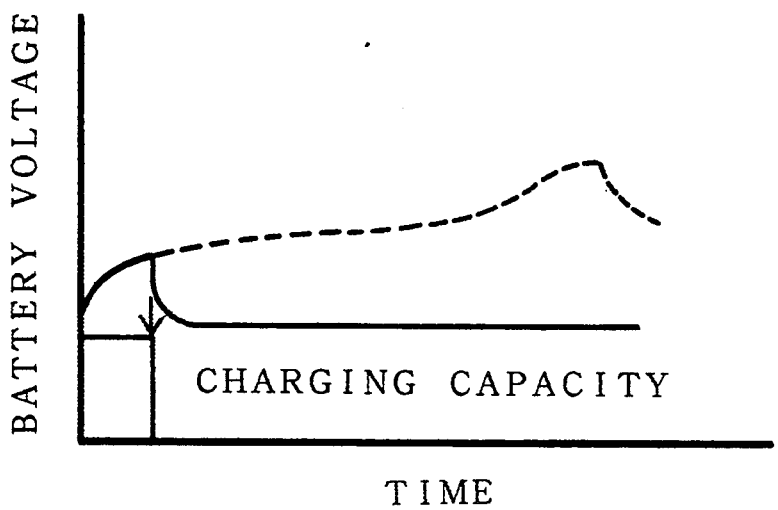
FIG. 3 is a graph showing premature disconnection during charging of a normally discharged battery.
Figure 4:
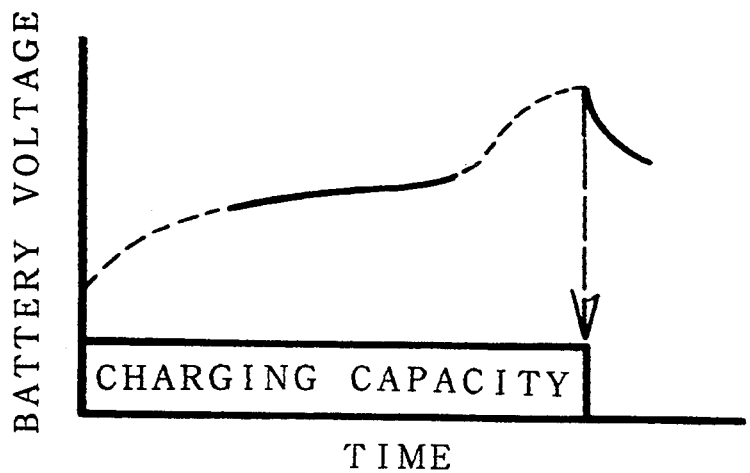
FIG. 4 is a graph showing the voltage curve during charging of a normally discharged battery.
Figure 5:
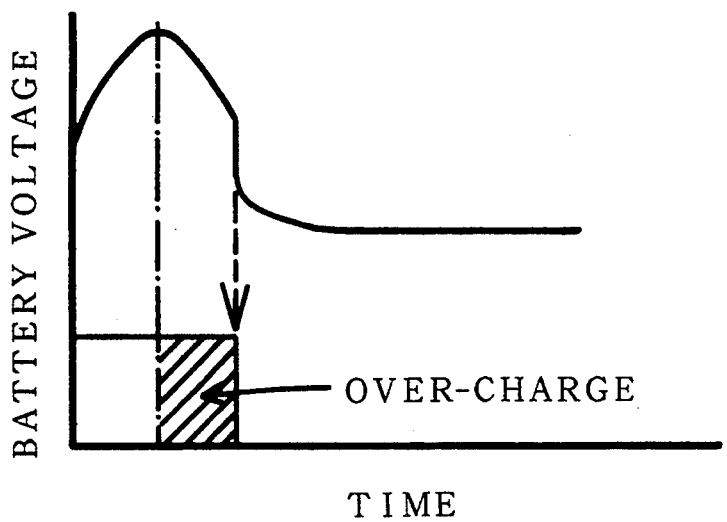
FIG. 5 is a graph showing over-charging of a fully charged battery.
Figure 6:
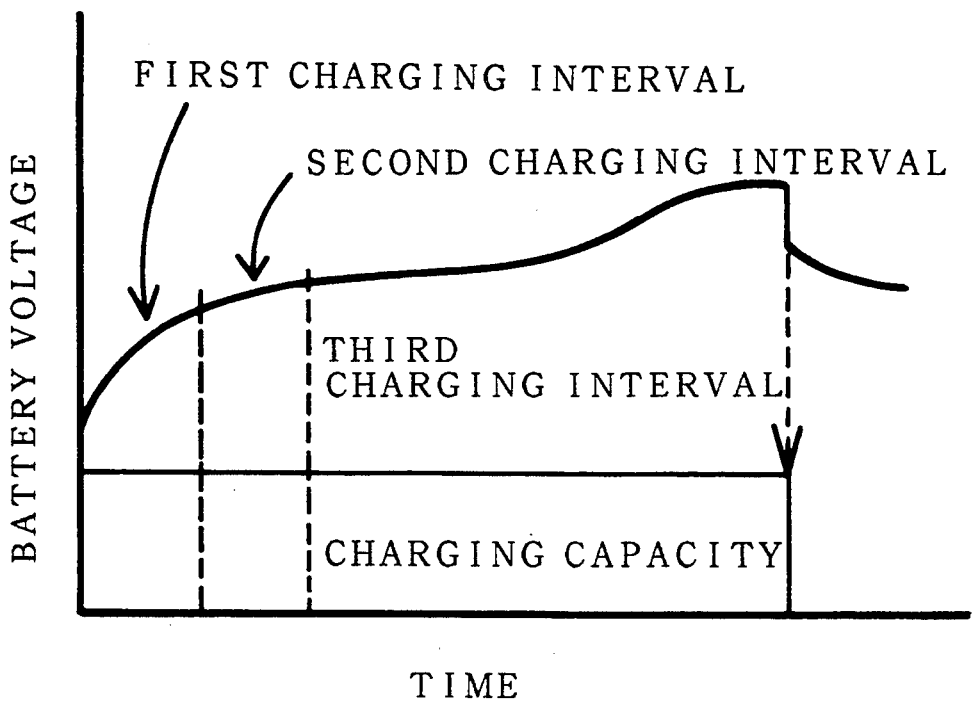
FIG. 6 is a graph showing the voltage curve during charging of a normally discharged battery by the method of the present invention.

The battery charging process is graphically presented in FIG. 6. As shown in this figure, a battery is charged successively in the first charging interval, the second charging interval, and the third charging interval.

In the first charging interval, a constant current charges the battery continuously regardless of the battery voltage. The first charging interval is set by a timer. The first charging interval is set for a time that allows full charging of a non-activated battery weather peak voltage is sensed or $\Delta V$ is sensed. If the first charging interval is too short, an over-discharged inactive battery cannot be fully charged. On the other hand, if it is too long, a fully charged battery will be detrimentally over-charged. If the non-activated nickel-hydrogen battery is charged at 1 C of current, the voltage curve will become normally after approximately two minutes. Consequently, when a nickel-hydrogen battery is charged with 1 C of current, it is desirable to set the first charging interval between 1 and 3 min.

In the second charging interval, a $\Delta V$ drop from a peak battery charging voltage is detected to cease charging. The second charging interval is set by a timer just as the first charging interval. The $\Delta V$ drop for stopping charging is normally adjusted within a 10 mV to 30 mV range. If the second charging interval is too short, full charging may not occur due to early disconnect. On the other hand if it is too long, charging may not be stopped even after full charging, and danger of over-charging increases. The second charging interval is set between 2 and 5 min. for charging a nickel-hydrogen battery with 1 C.

In the third charging interval, to avoid over-charging a battery that has become fully charged, the peak voltage value or voltage change smaller than a set value is detected to cease charging. All batteries that do not reach full charge in the first charging interval or the second charging interval become fully charged in the third charging interval. Consequently, there is no requirement to set the third charging interval with a timer. However, in the third charging interval when peak voltage is not detected, it is best to sense both peak voltage and $\Delta V$ to cease charging thus preventing battery over-charge.

Figure 7:
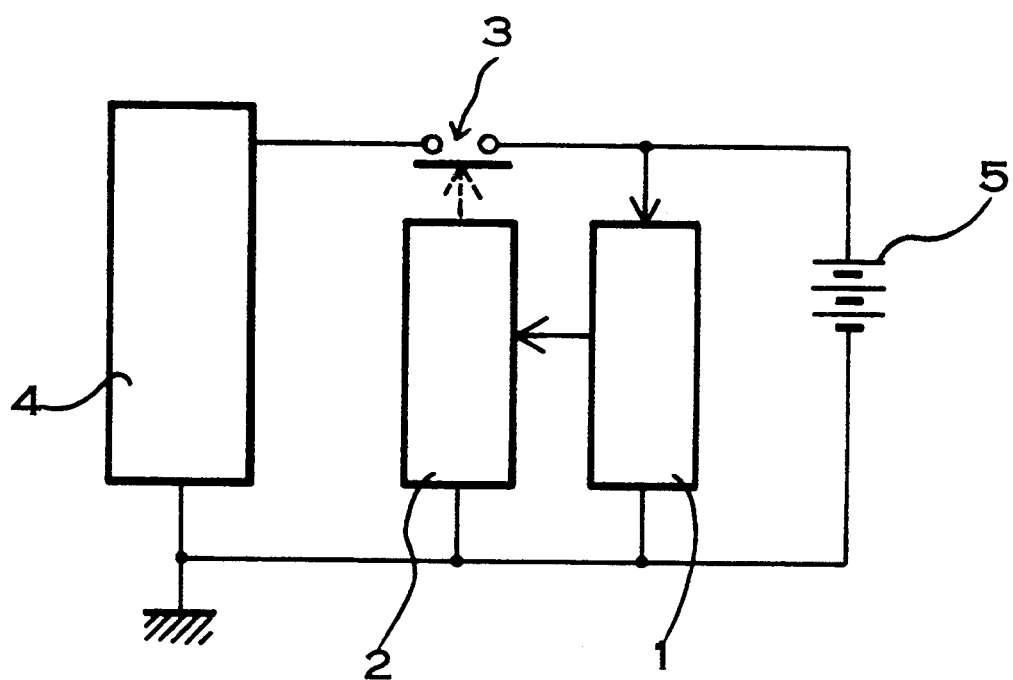
FIG. 7 is a circuit schematic of the charging circuit used in an embodiment of the method of the present invention.

FIG. 7 shows a battery charging circuit as described above. This circuit comprises an analog to digital (A/D) converter 1 for sensing battery S voltage and converting it to digital format, a control circuit 2 for performing operations on the output signal from the A/D converter 1, a switching device 3 that is switched on and off by the control circuit 2 to cease battery 5 charging, and a power supply 4 for charging.

The A/D converter 1 senses battery voltage during a fixed sampling period and inputs results to the control circuit 2. The sampling period is set, for example, in the range of 0.3 to several tens of seconds. The control circuit 2 operates on the periodically sampled battery voltage, determines if the peak voltage has been reached or if a $\Delta V$ drop from the peak voltage has occurred, and opens or closes the switching device depending on calculated results. Further, the control circuit 2 contains a timer (not illustrated) to switch between the first charging interval, the second charging interval, and the third charging interval. The power supply 4 supplies a fixed charging current to the battery 5 through the switching device 3.

Figure 8:
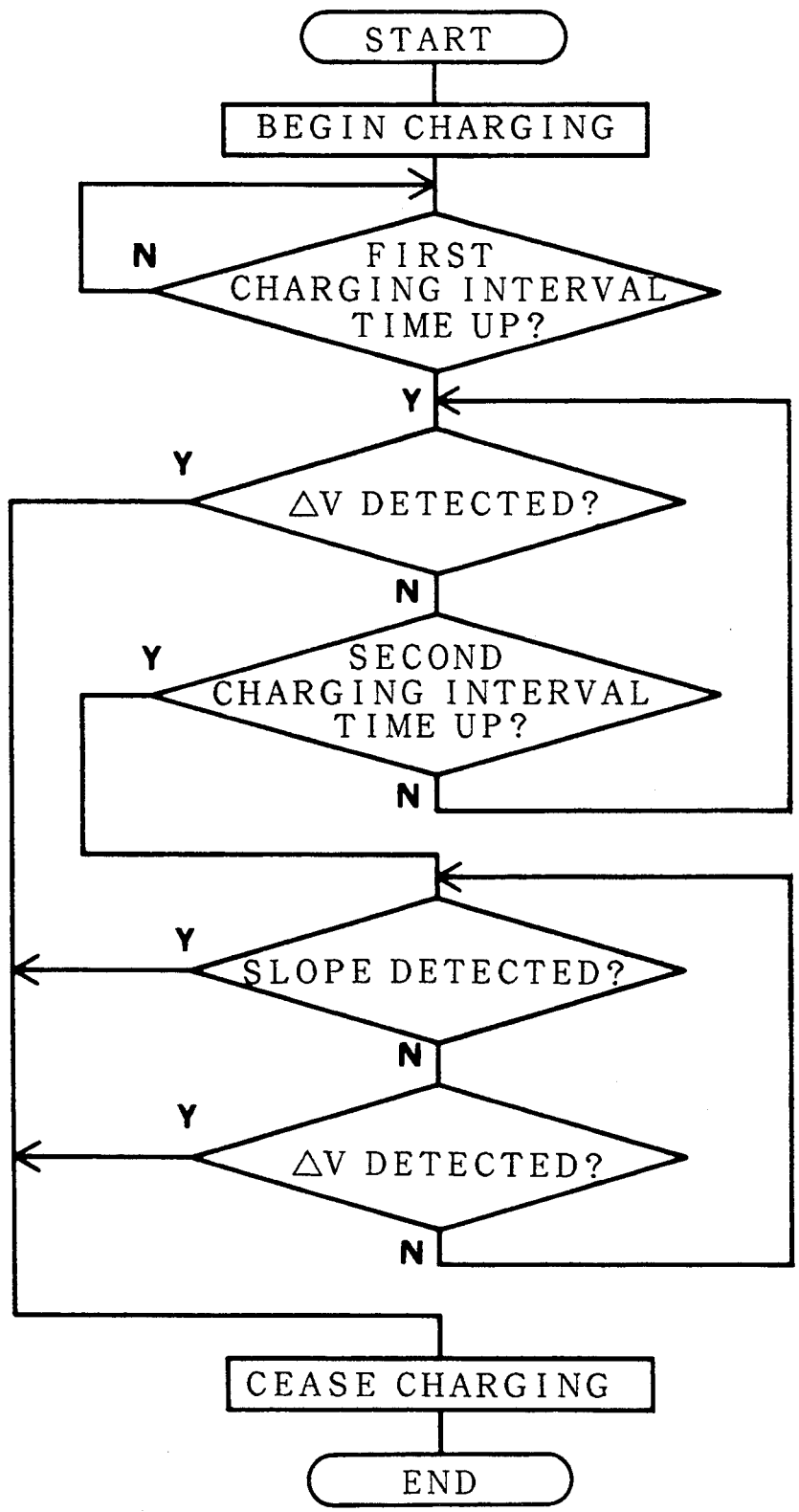
FIG. 8 is a flow-chart showing the battery charging flow for the method of the present invention.

Turning to FIG. 8, a flow-chart showing the control circuit 2 turning the switching device 3 on and off to charge the battery 5 is presented. In this flow-chart, a battery is charged as follows.

(1) When started, charging of battery 5 is begins.

(2) The control circuit 2 determines if the first charging interval is complete, and during the first charging interval the battery 5 is charged with a fixed current.

(3) After a set period of time, the first charging interval is complete, and $\Delta V$ voltage drop from a peak value is sensed. Charging is ceased when a $\Delta V$ drop is found. When a $\Delta V$ drop is not found, it is determined whether or not the second charging interval is complete. When the timing is determined to be within the second charging interval, it is again determined whether or not a $\Delta V$ drop has been found. In this step, it is determined whether or not the timing is within the second charging interval and whether or not $\Delta V$ has been found during the second charging interval.

(4) The third charging interval is entered when the second charging interval is complete based on a second set period of time, and in this step it is determined based on a rate of change (i.e. slope) of the battery voltage whether or not the peak voltage has been reached. When the peak voltage is detected, charging is ceased. When the peak voltage is not detected, for confirmation ΔV is sensed to cease charging. If a ΔV drop is found, charging is also stopped. If a ΔV drop is not found, it is determined whether or not the peak voltage value has been reached. In this step, both the peak voltage and ΔV are sensed and charging is ceased if either is found. A loop is established where both peak voltage and ΔV are sensed until either one is detected.

The battery charging method of the present invention as described above charges a battery with a first charging interval, a second charging interval, and a third charging interval. Specifically, a second charging interval, where ΔV is detected to cease charging, is provided between the third charging interval, where peak voltage is detected to cease charging, and the first charging interval, where charging is performed without sensing voltage. By providing a second charging interval, where charging is controlled by sensing ΔV, between the first and third charging intervals, the first charging interval can be made shorter. Consequently, the length of time that a battery is charged irrespective of voltage is shortened, and over-charging of a fully charged battery can be effectively prevented.

Further, the battery charging method described above has the feature that even though the interval of charging irrespective of voltage is shortened, early disconnect of non-activated batteries or normally discharged batteries is prevented and full charging can be reliably accomplished. This is because the second charging interval, where ΔV is sensed to detect full charging, is provided in the early disconnect prone interval between the first charging interval and the third charging interval.

Therefore, the battery charging method described above has the feature that batteries used in varied circumstances can be charged to an ideal state by preventing early disconnect and over-charging.

We claim:

1. A sequential battery charging method comprising:

charging a battery during a first time interval of a first predetermined duration regardless of a change in a voltage of the battery;

charging the battery and sensing the voltage of the battery during a second time interval of a second predetermined duration succeeding the first time interval;

ceasing charging the battery during the second time interval upon sensing of a predetermined drop of the voltage of the battery from a peak voltage of the battery during the second time interval, wherein charging of the battery in the second time interval is continued throughout the second time interval if the predetermined drop of the voltage of the battery from the peak voltage of the battery is not sensed during the second time interval;

charging the battery and sensing the voltage of the battery, if the charging of the battery is continued throughout the second time interval, during a third time interval succeeding the second time interval; and ceasing charging of the battery during the third time interval upon sensing of the peak voltage of the battery during the third time interval.

2. A method as claimed in claim 1, wherein the battery is a nickel-hydrogen battery, and the first predetermined duration is between one and three minutes.

3. A method as claimed in claim 1, wherein the battery is a nickel-hydrogen battery, and the second predetermined duration is between two and five minutes.

4. A method as claimed in claim 1, wherein the battery is a nickel-hydrogen battery, and the predetermined drop of the voltage of the battery is between ten and thirty millivolts.

5. A method as claimed in claim 1, wherein the peak voltage is sensed in the third time interval upon detecting a predetermined rate of change of the voltage of the battery, and wherein said method further comprises ceasing of the charging of the battery during the third time interval upon sensing another predetermined drop in the voltage of the battery.

* * * * *